No. 679,843. Patented Aug. 6, 1901.
B. HOLLAND.
MEANS FOR HOLDING LOOSE MEMBERS OF MACHINES UPON ENDS OF STUDS OR SHAFTS.
(Application filed June 6, 1901.)

(No Model.)

WITNESSES:
Harry J. Garceau
Andrew J. Ditcher

INVENTOR:
Benjamin Holland.
By S. Scholfield
ATTY.

UNITED STATES PATENT OFFICE.

BENJAMIN HOLLAND, OF PROVIDENCE, RHODE ISLAND.

MEANS FOR HOLDING LOOSE MEMBERS OF MACHINES UPON ENDS OF STUDS OR SHAFTS.

SPECIFICATION forming part of Letters Patent No. 679,843, dated August 6, 1901.

Application filed June 6, 1901. Serial No. 63,494. (No model.)

*To all whom it may concern:*

Be it known that I, BENJAMIN HOLLAND, a citizen of the United States, residing at Providence, in the State of Rhode Island, have invented a new and useful Improvement in Means for Holding Loose Members of Machines upon the Ends of Studs or Shafts, of which the following is a specification.

The nature of my invention consists in the employment of a notched and deflected cotter-washer, in combination with a cotter-pin, for holding loose members of a machine upon the end of a stud or shaft.

Figure 1:
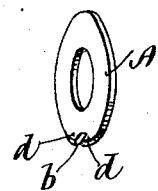
Figure 2:
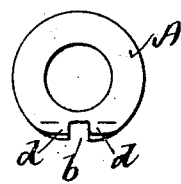
Figure 3:
Figure 4:
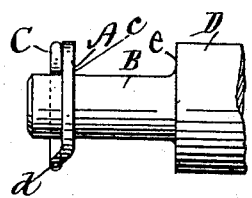
Figures 5, 6:
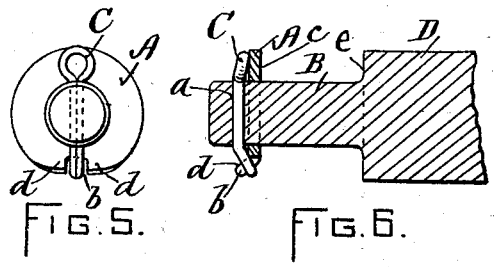

In the accompanying drawings, Figure 1 represents a perspective view of the notched and deflected cotter-washer. Fig. 2 represents a face view of the same. Fig. 3 represents an edge view. Fig. 4 represents a side view of a stud provided with the notched and deflected cotter-washer and its accompanying cotter-pin. Fig. 5 represents an end view of the same. Fig. 6 represents an axial section.

In the drawings, A represents a metallic washer provided at the edge with the notch $b$, adapted to receive the cotter-pin C, the opposite lips $d\ d$ thus formed being both deflected in the same direction, as shown in Figs. 1 and 3. In using this improved cotter-washer the washer A is placed upon the end portion B of the stud or shaft D and the cotter-pin C driven through the hole $a$, made therefor, the loose member of the machine being held between the inner side $c$ of the washer A and the shoulder $e$ of the stud or shaft, and by means of the notch $b$, into which the end of the cotter-pin C passes, as shown in Fig. 5, the cotter-washer A will be prevented from movement relatively to the cotter-pin, whereby the wear of the cotter-pin and the resulting increased looseness of the included member of the machine will be avoided.

A great advantage resulting from my invention is shown in Fig. 6, which shows the head and point of the cotter-pin deflected toward the washer, whereby the space between the face $c$ of the washer and the shoulder $e$ may be lessened, so as to insure the proper closeness of fit, the deflection of the end of the cotter-pin within the notch of the washer serving to effect this object without a disfiguring projection.

I claim as my invention—

1. A cotter-washer provided with a notch at its edge, and the deflected lips at each side of the notch, substantially as described.

2. The combination of a cotter-washer provided with a notch at its edge and the deflected lips, with the cotter-pin passing through the stud or shaft and into the notch of the washer, substantially as described.

BENJAMIN HOLLAND.

Witnesses:
SOCRATES SCHOLFIELD,
HARRY J. GARCEAU.